United States Patent [19]

McCormick

[11] 4,003,018
[45] Jan. 11, 1977

[54] METHOD AND APPARATUS FOR TESTING A PLURALITY OF GEOPHONES

[75] Inventor: Karl McCormick, Channelview, Tex.
[73] Assignee: Shell Oil Company, Houston, Tex.
[22] Filed: Feb. 9, 1976
[21] Appl. No.: 656,680
[52] U.S. Cl. .................................. 340/15; 73/1 DV; 340/5 C
[51] Int. Cl.² ........................................ G01V 1/16
[58] Field of Search ...................... 340/17, 15, 5 C; 73/1 D, 1 DV

[56] References Cited
UNITED STATES PATENTS

| 3,858,169 | 12/1974 | Bardeen | 73/1 DV |
| 3,903,505 | 9/1975 | Tims | 340/5 C |

*Primary Examiner*—Maynard R. Wilbur
*Assistant Examiner*—T. M. Blum

[57] ABSTRACT

A method and apparatus for testing a plurality of geophones disposed in either a series or series-parallel arrangement for both their activity and distortion. The activity of geophones is checked by applying a plurality of constant amplitude current pulses to the geophones and measuring the peak value of the resulting voltage. The distortion of the geophones is measured by applying a constant amplitude sinusoidal current to the geophones and detecting the harmonics of the resulting voltage.

13 Claims, 3 Drawing Figures

METHOD AND APPARATUS FOR TESTING A PLURALITY OF GEOPHONES

BACKGROUND OF THE INVENTION

The present invention relates to geophones used in seismic exploration and more particularly to a method and apparatus for testing geophones for both their activity and their distortion and noise level. Geophones used in seismic exploration are electromagnetic devices consisting of a magnet, a spring-mounted coil and a case for protecting the internal parts and support them in their proper relationship. When the geophone is placed on the ground, any movement of the earth will move the magnet with respect to the coil and produce a voltage signal. The voltage produced by the coil will be linear as long as the magnetic field is uniform and the magnet is moved linearly in relation to the coil. The voltage will not be linear if the magnetic field is not uniform or the springs prevent the coil from moving linearly. In addition, a restriction on the movement of the coil will reduce the geophones output voltage.

Recent developments in seismic exploration have been directed to detecting anomalies in seismic signals which at times are related to hydrocarbon deposits. The techniques for detecting amplitude anomalies in seismic data have been referred to as bright spots and similar terms. It is obvious that if one desires to inspect seismic data for amplitude anomalies, the first requirement is, the geophones used must produce uniform signals having low distortion and noise. In the past, it had been the practice to test the geophones in a central facility for distortion and noise level and rely upon a test of the overall resistance of the geophones when they were placed in the field to indicate their operativeness. After the measurement of distortion and noise in the central facility, the geophones could be mishandled and damaged while their measured resistance remained unchanged. For example, if the springs used for mounting the coil are bent, it is possible for the coil to drag on the magnet and introduce distortion in the signal. This type of damage to the geophone is not discovered by measuring the resistance of the geophones after they are placed in their desired locations. Also, frequently the geophone is not planted in an upright position but at an angle and in extreme cases, on their sides so that the coil drags on the magnet and fails to produce a true signal. Again, this type of condition is not detected by measuring the resistance of the geophone circuit. The only fault detected by measuring the resistance of the geophones after they are planted is the presence of an open circuit either in the cable connections or in the geophone coils.

In a paper given at the annual meeting of the Society of Exploration Geophysicists in Dallas, Texas, November 10–14, 1974, O. A. Fredrikson, E. P. Meiners and E. L. Thomes discussed a geophone tester they developed. Their tester applied a constant current to displace the geophone and then measured maximum and minimum voltages produced and the time between the termination of the current pulse and the first zero crossover of the voltage signal. From these measurements, they provide expressions for calculating damping factor, frequency of mechanical resonance and relative sensitivity. The authors also describe a system for measuring impedance at natural frequency of the geophone. The impedance measurement uses a constant AC current and observes the voltage generated across the input as an indication of malfunctioning geophones.

BRIEF SUMMARY OF THE INVENTION

While the system in the Fredrikson et al paper is useful in checking geophones, it does require manual computation to determine the the various responses of the geophone. Also, no provisions are made for testing geophones having different characteristics or disposed in different circuit configurations. In the case of testing for geophone malfunction, one must make a separate calculation for each system configuration.

The present invention solves the above problems by providing a simple method and apparatus for checking the geophones after they are planted for both their activity to insure that they are positioned properly and for distortion and noise. The apparatus for checking the activity of the geophones includes an oscillator for producing a constant amplitude current signal that is used to energize the geophone coils. The amplitude is adjusted to apply constant unidirectional current to the geophones regardless of the number of geophones and whether they are connected in a series or series-parallel relationship. The unidirectional signal when applied to the geophone coils will cause the coils to move and when the signal is terminated, the coils will fall to their original position and produce a voltage pulse of opposite polarity as they pass through the field of the magnet. The peak amplitude of the reverse voltage pulse is measured to produce a signal indicating the activity of the geophones. It is possible to detect the absence of a single geophone signal in a string of 32 geophones. In addition, means are provided to scale the peak voltage measuring circuit to compensate for variations in the number of geophones, different coils impedance and different dampening resistors. Of course, all the geophones used in the spread being tested must have the same coil impedance and same shunting resistance. This is a normal requirement in all seismic exploration since it would be impossible to process the data if geophones having different characteristics were used to produce the data.

The distortion and noise measuring circuit is similar to the activity measuring circuit and also utilizes an oscillator for producing a constant amplitude current signal. Both the positive and negative waves of the sinusoidal constant current signal are applied to the geophone, and the resulting geophone signal is sampled. The measuring circuit removes the oscillator frequency from the geophone signal and measures only the amplitude of the resulting harmonics. When the geophone signal is distorted as a result of damage to the coil, misalignment of the coil, damage to the support springs or faulty coil connections, the distortion will produce harmonics of the basic signal used for energizing the geophone. Thus, measuring the amplitude of any harmonics produced by the geophones will provide a measurement of the distortion. Noise may be measured in a similar manner by measuring the high frequency signals produced which are an indication of the noise produced by loose coil connections or other malfunctions.

In addition to the above, it is possible to use the distortion measuring circuit to measure the distortion of each individual geophone in the spread. This can be accomplished by laying all but one of the geophones in a horizontal position so that the coils are inactivated and measure the distortion of the single active geophone. This measurement can be made even when the geophones are coupled in a series or series-parallel relationship and one need not disconnect the geophones from the circuit.

BRIEF DESCRIPTION OF THE DRAWINGS

The present invention will be more easily understood from the following detailed description when taken in conjunction with the attached drawing in which.

PREFERRED EMBODIMENT

Figure 1:
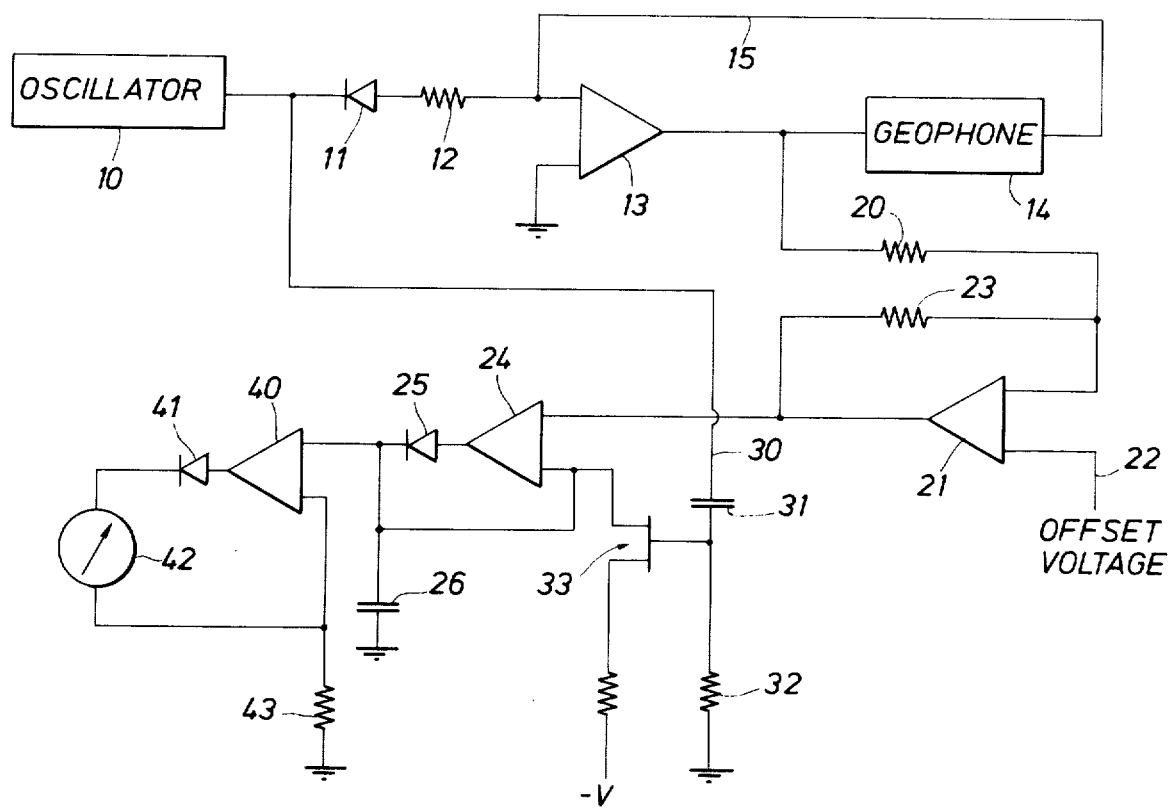
FIG. 1 is a circuit shown in block diagram form and suitable for testing the activity of a geophone.
Figure 3:
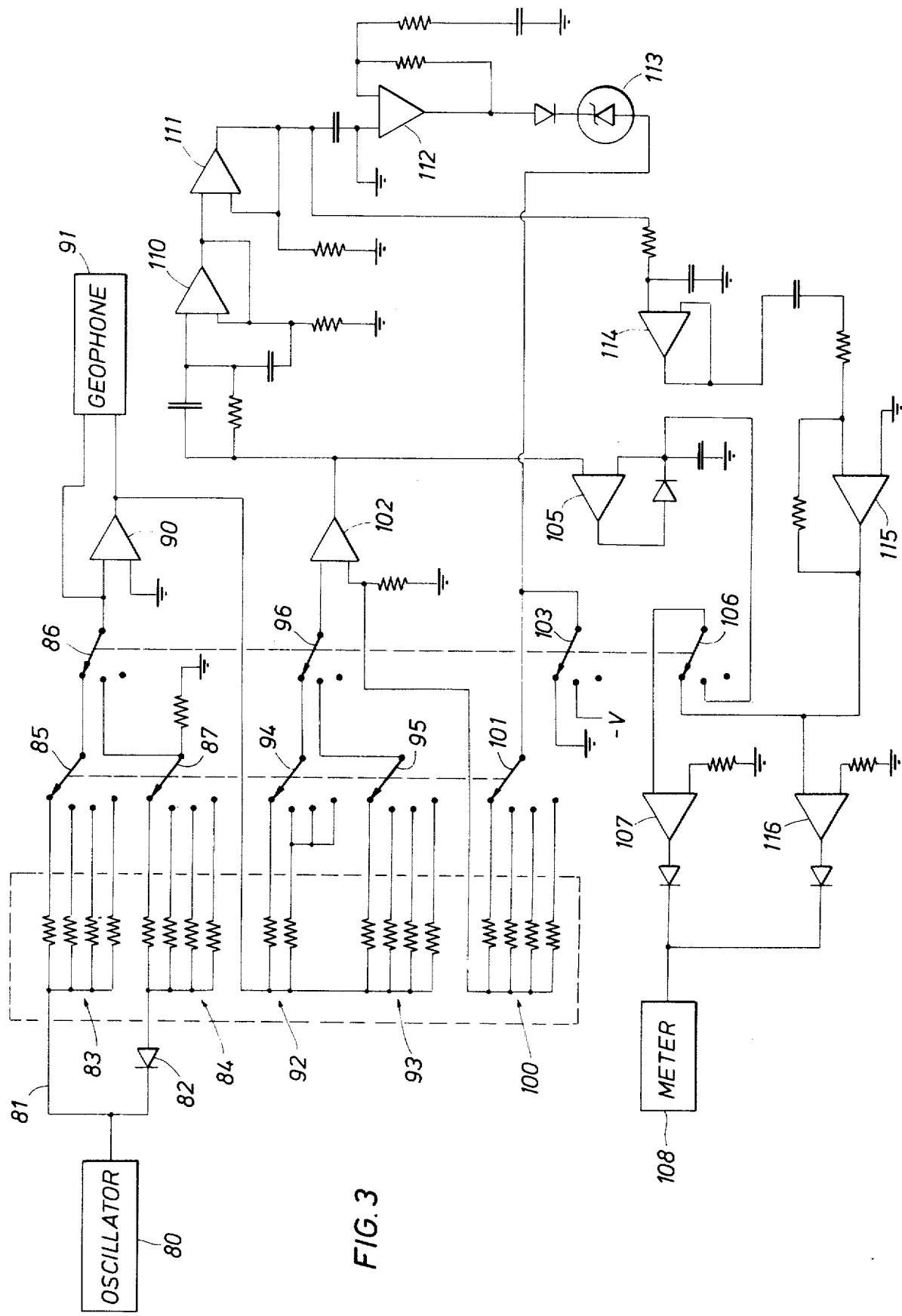
FIG. 3 is a detailed schematic drawing combining the circuits of FIGS. 1 and 2.

Referring to FIG. 1, there is shown an oscillator 10 having a diode 11 and resistor 12 disposed in its output circuit. The oscillator should be capable of producing a pulse of duration longer than the normal resonant period of the geophones being tested and of constant current. The diode is disposed to pass only negative pulses of the oscillator signal while the resistor provides a scaling means for varying the oscillator output to match both the geophone characteristics and the manner in which they are connected. As is well known by those skilled in the art, geophones are classified according to their impedance and their resonant frequency. The resonant frequency normally varies between 2 to 10 cycles per second although geophones having a resonant frequency of 40 to 60 cycles per second have been used. The normal impedance of the geophone varies between 100 and 300 ohms and frequently, a geophone is provided with a damping resistor. In an actual circuit, the scaling resistor 12 and output resistor 20 can be combined on a single circuit board as shown in FIG. 3 which can be plugged into the circuit to adjust the circuit for the particular type of geophones being used and whether they are disposed in series or series-parallel circuits. The oscillator signal is supplied to the inverting input terminal of an operational amplifier which is used as a current driver for the geophones. The other terminal of the operational amplifier is grounded while its output is connected to one input of the geophones.

The geophones are shown schematically at 14 and as explained above, may be disposed in either a series or combination series-parallel arrangement. The present circuit has been used to test up to 32 geophones which were disposed in two series strings of 16 geophones each with the two series strings disposed in a parallel arrangement. The output signal from the geophones is fed back by lead 15 to the input of the operational amplifier 13 to null the input current. This provides a high impedance for any geophone signal that is not present in the current driver input terminal. When the oscillator signal goes positive, the diode 11 will block its passage and thus the pulse will be removed from the coils of the geophones. When the pulse is removed from the coils of the geophones, the coils will fall and pass through the magnetic field of the geophone magnet. This will produce a negative voltage which is supplied through a resistor 20 to a scaling amplifier 21. The combination of the scaling amplifier and the resistance 20 is adjusted depending upon the number of geophones being tested and their disposition. The amplifier 21 is supplied with an offset voltage 22 so that only the voltage above a background level is passed to the peak voltage measuring circuit while a resistance 23 provides a feedback circuit.

The signal from the amplifier 21 is supplied to a second amplifier 24 which operates as a peak voltage measuring circuit, A diode 25 is disposed in the output of amplifier 21 to pass only the positive voltage produced by the amplifier 24 which is then stored on a capacitor 26. The output voltage is also supplied as a feedback signal to the other input of the amplifier. The signal on the capacitor 26 is sampled by a circuit comprising amplifier 40, diode 41 and meter device 42. The meter device 42 will display the amplitude of the peak voltage as measured by the circuit and can be calibrated to indicate the number of geophones that are inactive.

In order to remove the charge of the capacitor 26 after each cycle of the oscillator, a field effect transistor 35 is used as a gating circuit to periodically couple the capacitor 26 to a minus voltage source. The field effect transistor is turned on for a short time by the initiation of the negative voltage pulse of the oscillator 10. This negative voltage is supplied by a lead 30 to a time constant circuit comprising resistance 31, capacitance 32 and by adjusting the values of the capacitance and resistance, the time constant of the circuit can be adjusted.

When the above circuit is operated the proper values for the two resistors 12 and 20 must be provided for the particular type of geophone being tested and the particular arrangement of the geophones. When the proper resistors are in place and the oscillator is energized, the negative pulses from the oscillator will lift all of the coils of the geophones that are disposed in a vertical position. When the negative pulse terminates, the coils fall and produce a negative voltage whose peak value exceeding the offset of the amplifier 21 is measured and displayed on meter 42. The meter 42 can be calibrated to show whether 1, 2, 3 or 4 geophones are inactive. This calibration will remain constant regardless of the number or type of geophones being tested since the resistors are changed to agree with particular geophones used and the manner in which they are disposed. Thus the peak voltage signal that exceeds the offset voltage will always have the same value if all geophones are active. An inactive geophone can merely be a geophone which is not properly planted, that is it is inclined from the vertical so that its coil is sticking. It can also indicate a geophone which is inoperative due to a malfunction. In the case of a geophone which is misplanted, it can be determined from a visual inspection of the geophones while in the case of an inoperative geophone, one must proceed to isolate the faulty geophone as described below with respect to the circuit of FIG. 2.

Figure 2:
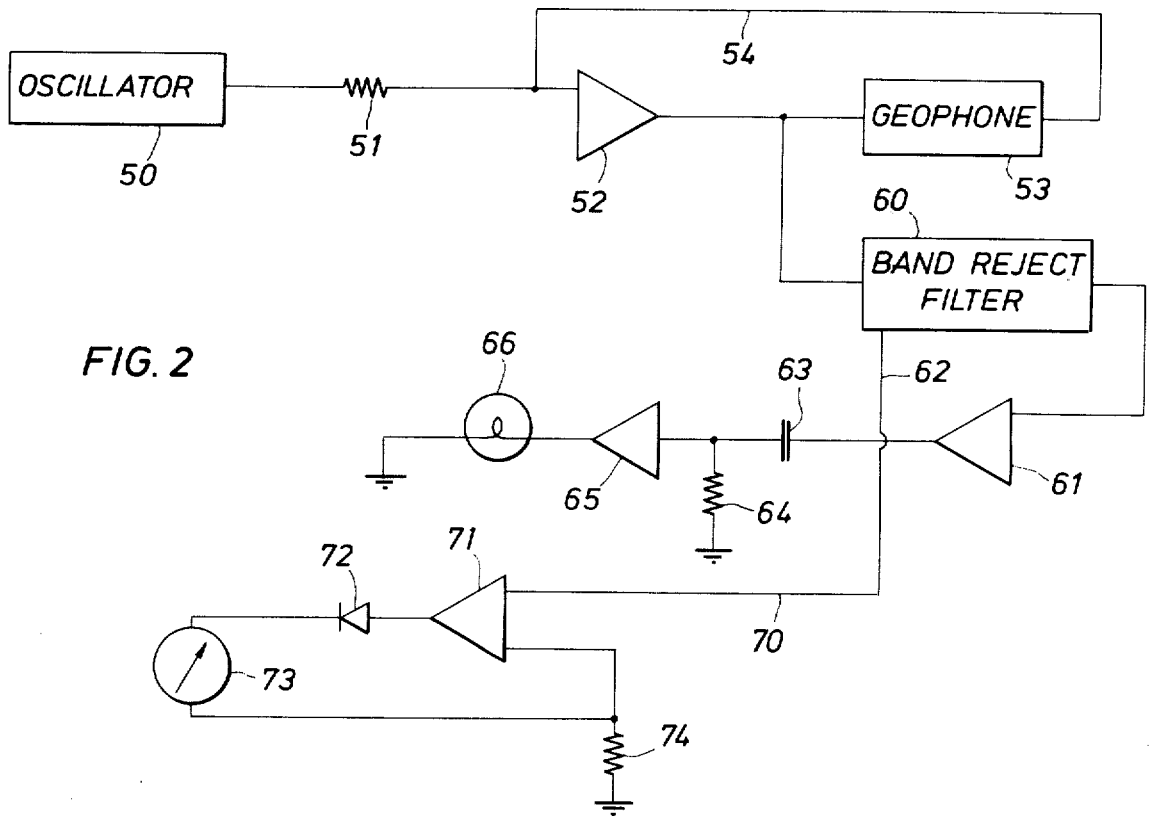
FIG. 2 shows a modified form of the circuit of FIG. 1 suitable for testing the distortion and noise of a geophone.

Referring now to FIG. 2, there is shown a modification of the above circuit which is suitable for testing for distortion and noise as well as inoperative geophones. The circuit can be used while the geophones are actually coupled in a circuit and disposed either in a series or a series-parallel arrangement. In particular, the oscillator 50 should be a low distortion alternating current oscillator having a calibrating or current setting resistor 51 disposed in its output circuit and selected for the particular type of geophone being used. The oscillator is connected to the input of a current driving amplifier 52 whose output is connected to the geophones 53. The geophone output is fed back through lead 54 to the input of the amplifier. As explained above, the geophones can be disposed in any arrangement; the only requirement being that all geophones except one be inactivated by placing them on their sides to prevent movement of the coils. The amplifier 52 will supply only sufficient current to the geophone circuit to cancel any oscillator signal that appears at the input terminal of the amplifier. Also, the amplifier will present a high impedance to any signals appearing across the geophone other than the oscillator or driving signal. This combination of a constant sinusoidal source and an operational driving amplifier makes it possible to measure geophone distortion even with the transmission lines attached to the plurality of geophones. The oscillator signal plus any distortion or noise signal will appear at the output of the amplifier 52 which is coupled through a band reject filter 60 to an operational amplifier 61. The band reject filter should be a notch type filter for removing only the oscillator frequency from the signal while preserving all the harmonics of the signal and other noise. The feedback circuit of the amplifier 61 includes the band reject filter.

The output of the amplifier 61 contains both the distortion of the geophone signal which is indicated by harmonics of the oscillator frequency and noise which is indicated by higher frequency intermittent signals. For example, the noise may be produced by an intermittent connection in the geophone leads between the coil and the supporting springs. This intermittent high frequency noise signal is measured by an amplifier 65 having a low frequency input filter formed by a capacitor 63 and resistance 64. The presence of noise signals are indicated by a simple indicating light 66. The distortion signal appearing on the output of the amplifier 61 is coupled by a lead 70 to a distortion indicating circuit which may comprise an amplifier 71, a diode 72 and indicating meter 73 disposed in a feedback circuit. The diode is disposed to pass only positive voltages which can be displayed on meter 73. The meter 73 can be calibrated to indicate the degree of distortion based on the amplitude of the signal.

Referring now to FIG. 3, there is shown a combined circuit for determining both the activity of the geophone array as well as the distortion of the individual geophones. The circuit utilizes a common oscillator 80 coupled by a lead 81 to a first series of parallel resistors 83 and through a diode 82 to a second series of parallel resistors 84. The first series of resistors 83 are current scaling resistors for the distortion measuring portion of the circuit and one of the resistors is selected by means of a four position scaling switch 85. Similarly, the second series of resistors 84 are for current scaling of the activity measuring portion of the circuit and one of the resistors is selected by means of a second scaling switch 87. The values of the resistors are chosen to provide proper scaling for various configurations of geophones, for example, a single string, two strings, three strings, or four strings of geophones. The selected resistor of the series 83 is coupled to one position of a three position test switch 86 while the selected resistor of the series 84 is coupled to a second position on the test switch 86. As illustrated in FIG. 3, the switches are all positioned for measuring the distortion of a single string of geophones. As explained above when testing geophones for distortion, it is necessary to lay all of the geophones except one on their side.

The signal from the switch 86 is coupled to the input of the current amplifier 90 to which the single geophone string of 91 is coupled. Any number of geophone strings up to four may be tested by positioning the switches 85 and 87 in the proper position. The output of the amplifier 90 is supplied to two sets of meter scaling resistors 92 and 93. The set of scaling resistors 92 comprise the meter scaling resistors for the distortion measuring portion of the circuit while the meter scaling resistors 93 comprise the scaling resistors for the activity measuring portion of the circuit. Resistors 92 are coupled with meter scaling switch 94 while the resistors 93 are coupled to a meter scaling switch 95. The switch 94 is coupled to one position on a meter switch 96 while the switch 95 is coupled to a second position on the meter switch 96. The meter switch 96 is coupled to one input of an offset voltage amplifier 102 while the other terminal is coupled to one of a series of resistances 100 by switch 101. The switch 101 in turn is coupled to a noise circuit or a ground as described below by means of a switch 103. The output of the offset voltage amplifier 102 is supplied to a band reject filter 110 and noise amplifier 111. The band reject filter formed by the amplifier 110 and its associated circuitry is a selective notch filter which removes the oscillator frequency from the signal while preserving the remaining portion of the signal. The output signal from the offset voltage amplifier 102 is also supplied to an amplifier 105 which rectifies the signal and supplies it to one position on the second test switch 106. The second test switch 106 in turn is coupled to a rectifying amplifier circuit 107 whose output is displayed on the meter 108.

The output from the noise amplifier 111 is supplied to a noise indicating circuit 112 which comprises an operational amplifier having a filter circuit for removing low frequencies while preserving the high frequencies. The presence of noise in the geophone indicated is by means of a neon lamp 113. The output of the noise amplifier 111 is also supplied to two additional amplifying states 114 and 115, with the amplifier 114 comprising a band pass amplifier that passes only those frequencies above the frequency of the oscillator. The signal from the amplifier 115 is supplied to both the rectifying circuit 107 and through the second test switch 106 to a second rectifying circuit 116 with the output of both rectifying circuits being coupled to the meter 108. The distortion signal requires fullwave rectification since both positive and negative cycles of the oscillator are used to measure distortion. In contrast, only the negative cycles of the oscillator are used to measure geophone activity.

From the above, it is seen that the circuit of FIG. 3 combines the circuits of both FIGS. 1 and 2 in a single measuring instrument. The switches 85 and 87, 94, 95, 101 and 106 may be ganged so that one may select the proper resistance for the particular array of geophones being tested. Similarly, the switches 86, 96, 103 and 106 are ganged so one can select one of three positions. As shown, all switches are positioned in the distortion measuring position, the second position being the activity measuring portion and the third position being the off position.

The resistors enclosed within the dotted line 120 are mounted on a single printed circuit board that plugs in a socket exposed on the front of the instrument. In this way, separate plug-in printed circuit boards may be provided for various types of geophones and various configurations of the geophone strings. In seismic exploration, geophones are always permanently wired in predetermined string configurations. For example, eight geophones may be wired in series with two series of eight geophones being disposed in parallel to form a geophone string. When the geophones are actually placed in the field, one to four of the strings may be used in a single array and provisions must be made for testing one to four individual strings. Since all of the geophones used by any one seismic crew will have the identical characteristics and all strings will be wired in the same way, it is only necessary to provide a single plug-in card for any particular seismic crew. The necessity of various cards occurs due to the use of different types of geophones by different crews and the wiring of the geophones in different configurations. The use of current scaling, meter scaling and voltage offset resistors provides a means by which the meter may be previously calibrated to indicate the activity of a particular type of geophone wired in a particular configuration. Thus, the meter 108 can be calibrated to read "in loss of activity of 1 to 4 geophones", from an array. Similarly, the meter can be calibrated to read "percent of distortion" of the signal of a single geophone by means of the calibrating resistors and scaling resistors. These features provide a universal instrument which does not require calculation on the part of the operator or any adjustment on the part of the operator. The resistances on the printed circuit board can be calibrated in a test facility before they are installed on the board and thus eliminate the need for any calibration in the field.

In operating the distortion measuring circuit, it is first necessary to lay all of the geophones except the one being tested on their sides. This will immobilize the geophones and it is not necessary to disconnect them from the circuit or disconnect the cable connecting the geophones to a recording truck. After all the geophones except one are immobilized, the oscillator can be energized to produce the constant amplitude sinusoidal current signal for energizing the one geophone. The distortion and the possibility of noise can then be measured as explained above.

I claim as my invention:

1. An apparatus for testing a plurality of geophones for malfunctions comprising:
   first circuit means, said circuit means being coupled to said geophones to apply a series of constant amplitude current pulses to said geophones, said pulses having a duration exceeding the normal resonant period of the geophones; and
   measuring means coupled to said geophones to measure the peak voltage response of the geophones to said current pulses.

2. The apparatus of claim 1 in which said first circuit means comprises an oscillator and diode combination disposed to pass only unidirectional pulses to the geophones.

3. The apparatus of claim 1 and in addition a storage circuit, said storage circuit being coupled to said voltage measuring means to store the peak voltage measurement until the peak voltage measurement from the succeeding unidirectional pulse is obtained.

4. The apparatus of claim 3 and in addition a display means, said storage means being coupled to said display means to display the value of the peak voltage.

5. The apparatus of claim 1 wherein said first circuit means comprises an oscillator for producing a constant amplitude sinusoidal signal and said measuring circuit comprises a filter means for removing the frequency of said oscillator and indicating means for displaying the value of any signal remaining after the removal of said oscillator frequency.

6. A method for testing a plurality of geophones for malfunctions comprising:
   applying a series of constant amplitude long duration current pulses to said geophones, the duration of the pulses exceeding the normal resonant period of the geophones; and
   measuring the peak voltage response of said geophones to said pulses.

7. The apparatus of claim 1 wherein said geophones are disposed in series.

8. The apparatus of claim 1 wherein said geophones are disposed in a combination series-parallel arrangement.

9. An apparatus for testing a plurality of geophones for both activity and distortion, said apparatus comprising:
   a first series of scaling resistors, one end of each resistor being connected to a common point and the other end of each resistor being connected to a separate position on a first multiple position scaling switch means;
   a second series of scaling resistors, one end of each resistor of said second series of resistors being connected to a second common point and the other end of each resistor being connected to a separate position on a second multiple position scaling switch means;
   a low distortion oscillator, said oscillator being coupled to said first and second common points;
   a multiple position test switch means, said first and second scaling switch means being coupled to separate positions on said test switch and said test switch being coupled to the geophones to be tested;
   two series of meter scaling resistors, each resistor of one of said series being coupled to a separate position on a first multiple position meter scaling switch and each resistor of the other of said series being coupled to a separate position on a second multiple position meter scaling switch;
   a meter switch, said first and second meter scaling switches being coupled to said meter switch;
   a rectifying circuit, said meter switch being coupled to said rectifying circuit;
   a meter display means;
   a second multiple position test switch, said rectifying circuit being coupled to one position on said second test switch and said second test switch being coupled to said meter display means;
   an amplifying circuit, the input of said amplifying circuit being coupled to said meter scaling switch and output being coupled to a second position on said second test switch; and
   a second rectifying circuit, said amplifying circuit being coupled to said second rectifying circuit and said second rectifying circuit being coupled to said meter means.

10. The apparatus of claim 9 wherein said oscillator is coupled directly to one of said common points and coupled through a rectifying means to the other of said common points.

11. The apparatus of claim 9 wherein said amplifying circuit is coupled to a high pass filter circuit for removing low frequencies, said filter circuit being coupled to an indicating means.

12. The apparatus of claim 9 wherein said first and second scaling switches and said first and second meter scaling switches are ganged to move in unison.

13. The apparatus of claim 12 wherein said first and second test switches and said meter switch are ganged to move in unison.

* * * * *